(12) United States Patent
Norris

(10) Patent No.: US 6,288,972 B1
(45) Date of Patent: Sep. 11, 2001

(54) CLEATED BOOT FOR MARINE SEISMIC CABLES

(76) Inventor: Mike Norris, 12602 Scouts La., Cypress, TX (US) 77429

( * ) Notice: Subject to any disclaimer, the term of this patent is extended or adjusted under 35 U.S.C. 154(b) by 0 days.

(21) Appl. No.: 09/325,323

(22) Filed: Jun. 3, 1999

(51) Int. Cl.[7] ........................................ G01V 1/38
(52) U.S. Cl. .................................. 367/16; 367/20
(58) Field of Search ........................ 367/20, 159, 153, 367/165, 118, 17, 16; 310/337

(56) References Cited

U.S. PATENT DOCUMENTS

| | | | |
|---|---|---|---|
| 4,870,625 | * | 9/1989 | Young ................................ 367/16 |
| 5,010,531 | * | 4/1991 | McNeel ............................. 367/188 |
| 5,365,491 | * | 11/1994 | Sullivan et al. .................... 367/15 |
| 5,747,754 | * | 5/1998 | Svenning et al. .................. 367/17 |

* cited by examiner

*Primary Examiner*—Hezron Williams
*Assistant Examiner*—Victor J. Taylor
(74) *Attorney, Agent, or Firm*—Alan J. Atkinson

(57) ABSTRACT

A marine seismic housing having cleats for anchoring geophone sensors to the seafloor, and a method for placing the geophone sensor on the seafloor. The housing is attached to the bottom cable and is lowered into contact with the seafloor. The cleats puncture the seafloor upper surface to improve the coupling between the sensor and the seafloor. The cleats can have different shapes and lengths, and can be integrated within the housing or can be detachable. The housing exterior surface can comprise multiple flat surfaces for enhancing the housing coupling to the seafloor and for increasing the housing stability relative to the seafloor.

19 Claims, 3 Drawing Sheets

CLEATED BOOT FOR MARINE SEISMIC CABLES

BACKGROUND OF THE INVENTION

The present invention relates to the field of geophones in marine seismic operations. More particularly, the invention relates to an improved geophone housing and method for increasing the coupling between geophones and the seafloor. Improved coupling increases the fidelity of the full wavefield recorded by a sensor.

Ocean bottom cables having multi-component geophone sensors detect energy reflected from subsurface geologic formations. Coupling between geophone sensors and the seafloor is essential to the gathering and processing of accurate seismic data. In conventional operations, geophone sensors were taped to the cable exterior before the cable was laid on the seafloor. Geophone quality for such systems fluctuated depending on the effectiveness of the coupling between the sensor and seafloor. When geophone sensors are taped to a bottom cable, clocking problems arise and the sensor coupling to the seafloor is not efficient because sensor orientation is difficult to control. As the cable is laid from the water surface to the seafloor, the taped sensors can land on top, below, or beside the cable. This variation causes poor sensor/seafloor coupling, resulting in variable inline and crossline transfer functions which cause frequency variations between inline and crossline geophones in the cable.

Certain seismic cable systems have been developed to pull cable over large distances so that hand labor to reset each geophone is reduced. U.S. Pat. No. 3,825,886 to Thigpen (1974) disclosed a land based towable seismic detector casing having a flat cable between adjacent detector casings. U.S. Pat. No. 3,954,154 Kruppenback et al. (1976) disclosed another system for a towed land cable. Similar actices exist for ocean bottom and bottom drag cables as the vessel pulls the cable from one position to another.

Various systems have been proposed to enhance sensor coupling with the seafloor. U.S. Pat. No. 5,142,499 to Fletcher (1992) disclosed a marine seismic receiver array having a pointed end for engaging the seafloor. U.S. Pat. No. 5,253,223 to Svenning et al. (1993) disclosed a marine geophone housing having a pointed end for anchoring the housing to the seafloor.

Housings to contain geophone sensors have been developed. U.S. Pat. No. 4,870,625 to Young (1989) disclosed housings for enclosing geophone sensors. Hydrophone sensors were suspended above the seafloor while the geophone sensors were encapsulated in housings laid on the seafloor. The housings included serrations for resisting lateral movement of the housings due to ocean currents. The serrations were specifically designed to resist movement caused by ordinary wave action and to avoid burrowing into the seafloor on the grounds that such burrowing would complicate removal of the geophones from contact with the seafloor. The detached nature and shape of the device potentially improved its coupling ability while significantly complicating retrieval and deployment of the sensors and cabling system. U.S. Pat. No. 5,365,491 to Sullivan et al. (1994) disclosed a marine geophone anchor having pockets for containing a weighted material such as sand.

Seafloor soil conditions can vary significantly from one survey site to another, and within the same site. Sensor housings useful in one soil condition may not adequately provide effective seafloor coupling along the entire survey area. Accordingly, a need exists for an improved apparatus and method for containing geophone sensors, and for coupling such sensors to the seafloor.

SUMMARY OF THE INVENTION

The present invention provides an apparatus and method for coupling a single or multi-component geophone sensor and cable to the seafloor in marine seismic operations. The apparatus comprises a housing attachable to the cable, wherein the housing defines an interior space for containing the sensor, and wherein the housing has an exterior surface and a plurality of cleats extending outwardly from the housing exterior surface for releasably gripping the seafloor. In other embodiments of the invention, an apparatus for deploying geophone sensors to the seafloor in marine seismic operations comprises a bottom cable deployable into the water and a housing attached to the cable. The housing defines an interior space for containing the sensor and the housing has an exterior surface. The interior space of the housing preferably positions the center or rotation and the center of mass of the sensor and cable combination in a substantially coincident orientation. A plurality of cleats extending outwardly from the housing exterior surface releasably grip the seafloor.

The method of the invention comprises the steps of deploying a vessel in water, wherein the vessel transports bottom cable and a plurality of sensor containing cleated housings attached to said cable, paying out the bottom cable and attached housings into the water, positioning the bottom cable and attached housings at selected positions on the seafloor so that the housing cleats penetrate the seafloor and anchor the housings to the seafloor, operating the sensors to detect geophysical data, and retrieving the housings from the seafloor.

DESCRIPTION OF THE PREFERRED EMBODIMENTS

The present invention provides a unique apparatus and method for coupling geophone sensors to the seafloor. As used herein, the terms "geophone sensor" or "sensor" means any device capable of converting single or multidimensional ground motion into a voltage or numerical analog. The discovery has been made that even nominal movement of a geophone housing relative to the seafloor improves the coupling between the sensor and seafloor. From this observation, the invention provides effective coupling of a sensor to a seafloor by providing penetration through the seafloor 18 surface layer.

Figure 1:
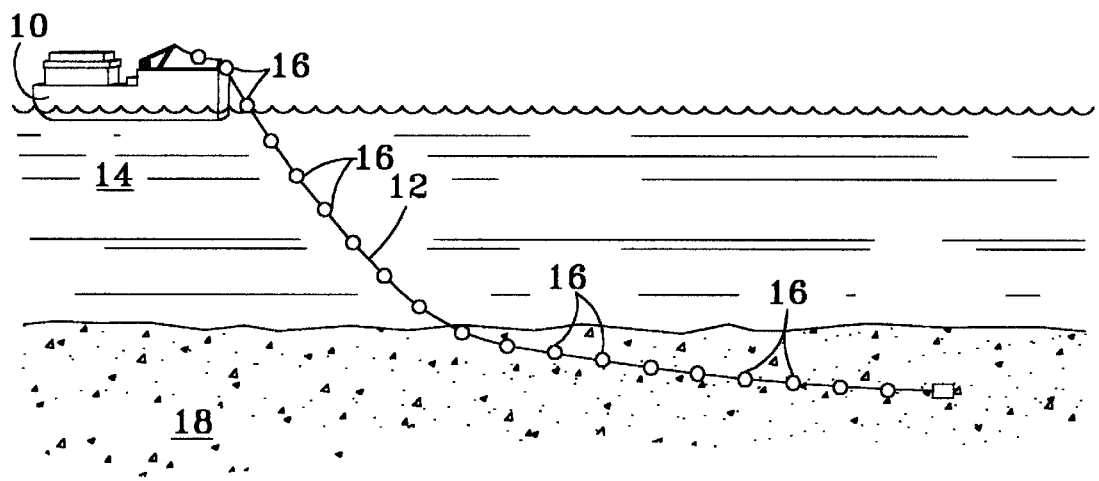
FIG. 1 illustrates a vessel for laying bottom cable.
Figure 2:
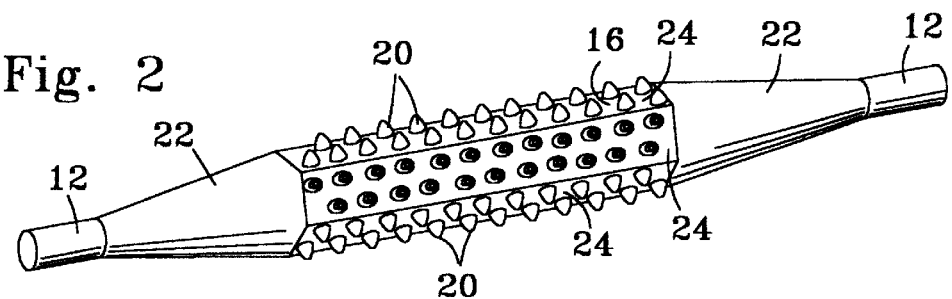
FIG. 2 illustrates a housing attached to the cable and having cleats extending outwardly from the housing exterior.

FIG. 1 illustrates vessel 10 laying cable 12 in water 14. Multiple cable housings 16 are attached to cable 12 and are lowered into contact with seafloor 18 in a selected pattern and orientation. FIG. 2 illustrates one embodiment of housing 16 wherein cleats 20 are engaged with the exterior surface of housing 16. As used herein, the term "cleat" means a nub, protruberance, knob, spike, or other projecting discontinuity extending outwardly from housing 16. The cross section of each cleat can be circular, elliptical, irregular, rectilinear, elongated, linear along the said housing length, or circumferential around the housing.

The exterior surface of housing 16 can be shaped in different configurations to maximize coupling effectiveness between housing 16 and seafloor 18 and to normalize the inline and crossline coupling areas. As shown in FIG. 2, housing 16 can have tapered ends 22 to smooth the transition between cable 12 and housing 16. Housing 16 can be constructed using thermoplastic, metal, or other material which provide sufficient structural integrity. Additionally, housing 16 can have flat surfaces 24 parallel to cable 12 and to a longitudinal axis through housing 16 which provide a base for cleats 20. The combination of flat surfaces 24 and cleats 20 cooperate to couple housing 16 to seafloor 18. Cleats 20 puncture the loose sediment layers typically formed on the upper surface of seafloor 18 and penetrate into seafloor 18. This penetration secures housing 16 to seafloor 18 to resist movement due to currents, wave action, and other environmental forces. Additionally, cleats 20 uniquely cooperate to couple housing 16 to seafloor 18 by penetrating the initial, unconsolidated, non-linear surface of seafloor 18 so that cleats 20 engage the consolidated soil below the unconsolidated surface. By anchoring directly into consolidated soil, detection capabilities of marine seismic sensors is enhanced.

As shown in FIG. 2, cleats 20 are oriented on flat surfaces 24 so that a selected space or minimum distance exists between adjacent cleats 20. This space provides additional coupling surface between housing 16 and seafloor 18 as cleats 20 puncture the upper layer of seafloor 18 and disturb such upper layer to displace such sediments. This cooperative action provided by cleats 20 causes housing 16 to "seat" or "nest" against seafloor 18 so that the effectiveness of the coupling is increased. Such enhanced coupling is accomplished without increasing the difficulty of displacing housing 16 from seafloor 18 after each seismic shot sequence is performed. Because the penetration of cleats 20 is limited and does not extend deeply into seafloor 18, cable 12 can be lifted or pulled to separate housings 16 from seafloor 18 and to move housings 16 to another location.

The cross sectional shape of housing 16 can be shaped in different configurations to accomplish different objectives. The overall, maximum width of housing 16 should be minimized to reduce required storage on board vessel 10 and to facilitate handling through convention cable deployment equipment. However the width should be sufficiently wide to normalize the inline and crossline transfer functions and to provide stability between housing 16 and seafloor 18 when housing 16 is impacted by currents, wave action, and other environmental forces. As shown in FIG. 2, the exterior surface of housing 16 in a cross section perpendicular to the longitudinal axis of housing 16 is hexagonal. Although other configurations are useful for the invention, this preferred configuration balances the need to maintain a relatively wide footprint while reducing the overall width of housing 16, and provides an optimized shape between the maximum allowable diameter and the crossline width. This crossline cross section assists in equalizing the transfer functions between inline and crossline geophones.

Cleats 20 are oriented in triangular patterns in one embodiment of the invention, however other shapes and configurations can be formed. Cleats 20 can be integrated within housing 16 or can be detachable to permit adjustments to varying seafloor 18 soil conditions. The length of cleats 20 can shortened or lengthened according to the softness or depth of the seafloor 18 surface formations. Additionally, cleats 20 of different heights can be combined in different patterns. As cleats 20 engage seafloor 18, liquified bottom material on the upper crust of seafloor 18 can be plastically deformed or displaced to facilitate engagement of cleats 20 with unconsolidated seafloor 18 formations. Such deformation or displacement further contributes to establishing an effective coupling between housing 16 and seafloor 18.

Figure 3:
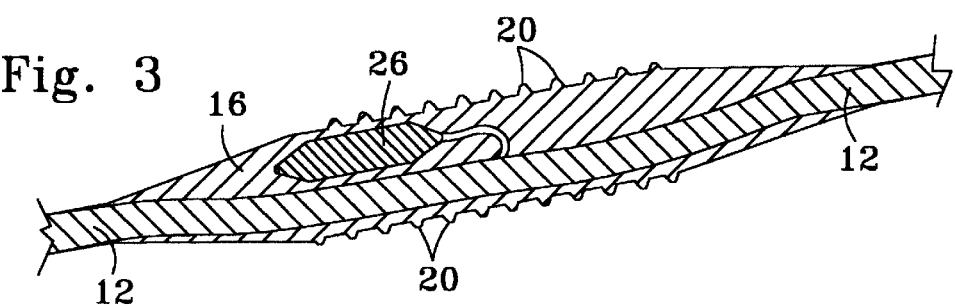
FIG. 3 illustrates a cross sectional view of the housing an interior sensor.

FIG. 3 illustrates a sectional view of housing 16 and the orientation of cable 12 within housing 16. By routing cable 12 through one side of housing 16, a detection device such as geophone sensor 26 can be placed near the centered, longitudinal axis of housing 16. One or more sensors 26 can be integrated within each housing 16 or in adjacent housings. By centering sensor 26 within housing 16, the center of mass and center of rotation for housing can be placed along the housing longitudinal axis in a direction parallel to the long dimension of cable 12, and uniformity in the orientation of each sensor 26 and in the signals detected by each sensor 26 can be enhanced. The mass of housing 16 can be matched to the soil conditions forming seafloor 18, or can be weighted to a greater density to enhance the gravitational force bonding housing 16 to seafloor 18.

Figure 4:
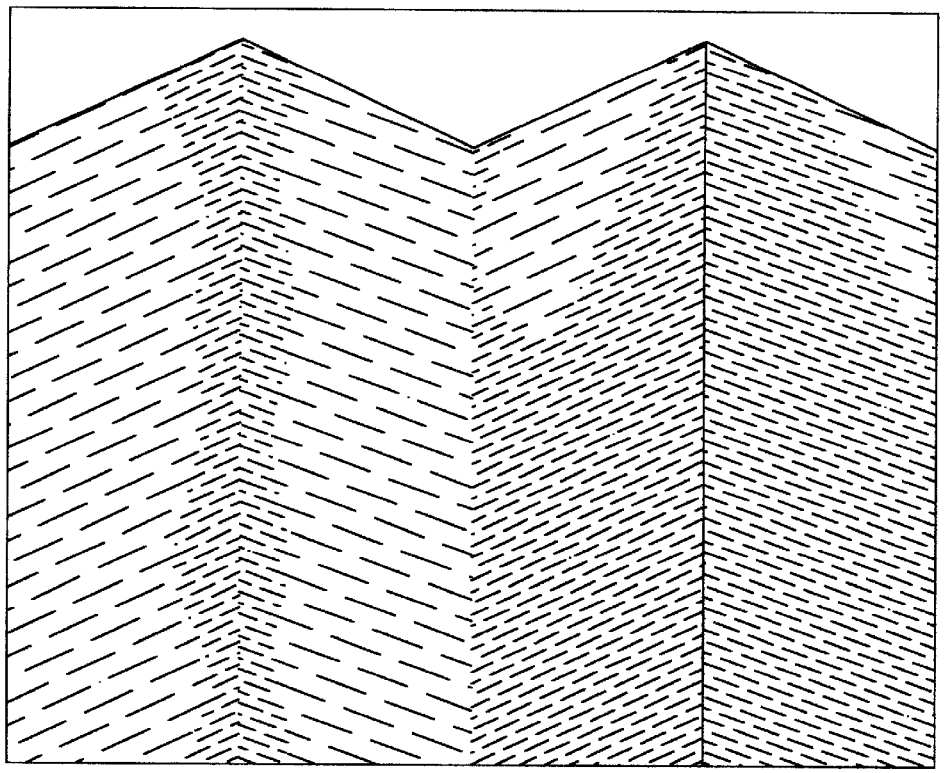
FIG. 4 illustrates a common receiver gather for conventional, prior art taped sensors.
Figure 5:
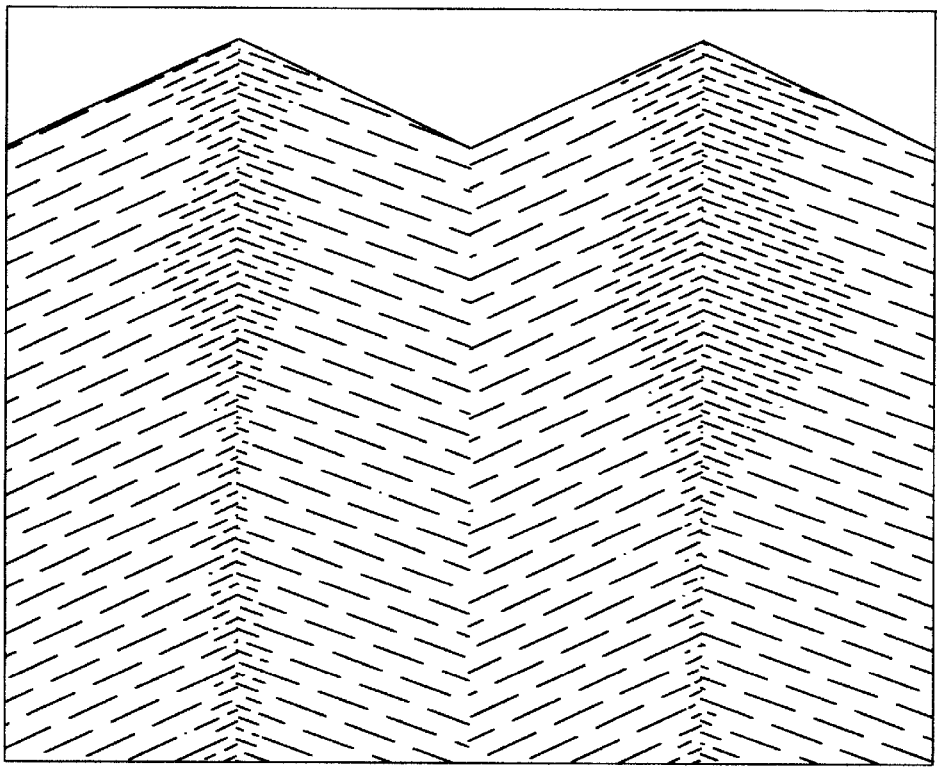
FIG. 5 illustrates common receiver gathers using sensors positioned within a cleated housing.
Figure 6:
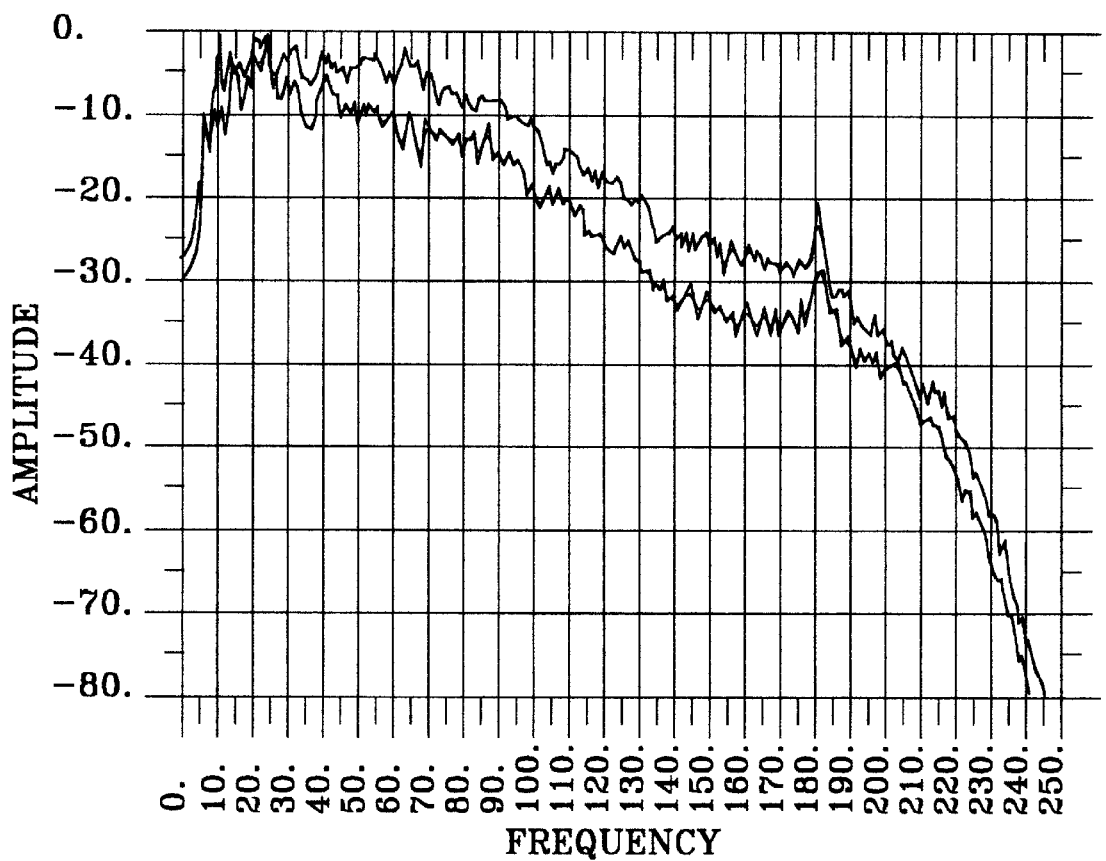
FIG. 6 illustrates a comparison between the invention and prior art data.

The performance characteristics of the invention are measurable. FIG. 4 illustrates a common receiver gather for conventional, prior art taped sensors. FIG. 5 illustrates common receiver gathers using sensors 26 positioned within housings 16 having cleats 20 as described by the present invention. FIG. 6 illustrates a graph of amplitude versus frequency showing the contrast between conventional taped sensors versus the present invention having a sensor 26 attached to a housing 16 having cleats 20.

Figure 7:
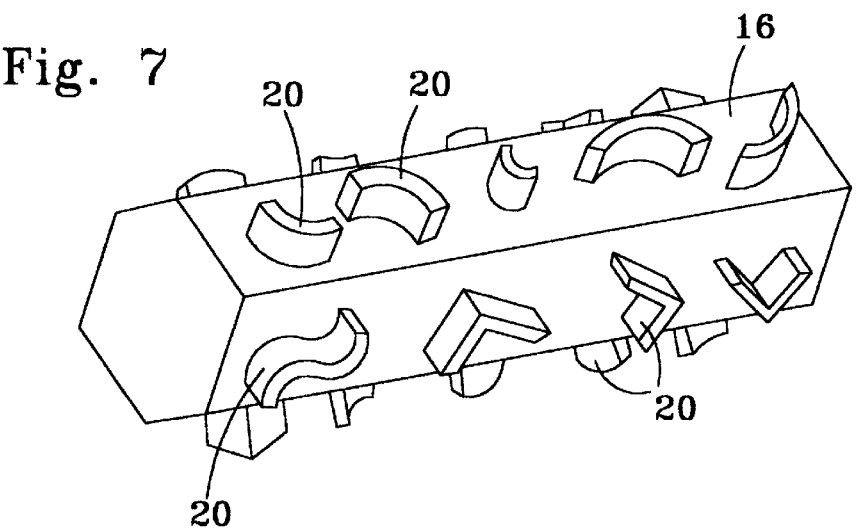
FIG. 7 illustrates one embodiment of a cleat pattern.

Cleats 20 can have different shapes, patterns and orientations relative to housing 16. Cleats 20 can be formed with plastic, ceramic, metal, or other materials, and can be detachable from housing 16 as desired. Cleats 20 can be shaped as spikes, cones, fins, arcuate ribs, treads, or other configurations. FIG. 7 illustrates one embodiment of cleat 20 and cleat 20 pattern wherein cleats 20 comprise tabs extending outwardly at different distances from the exterior surface of housing 16.

The method of the invention comprises the steps of deploying a vessel in water, wherein the vessel transports bottom cable and a plurality of sensor containing cleated is housings attached to said cable, paying out the bottom cable and attached housings into the water, positioning the bottom cable and attached housings at selected positions on the seafloor so that the housing cleats penetrate the seafloor and anchor the housings to the seafloor, operating the sensors to detect geophysical data, and retrieving the housings from the seafloor. In other embodiments, the method can include the steps of replacing cleats on the housing with cleats of a different length, of attaching the housings to the cable, of moving the housings to another position on the seafloor before the housings and cable are retrieved to the vessel, and of enclosing an integrated sensor/cable module with a cleated sensor housing.

The invention is applicable to cables such as bottom cable 12 and to other types of cables such as continuous tube style cables or cable systems where the sensors are integrated into the cable assembly. Housing 16 protects attached sensors from impacts and vibrations while enhancing the coupling of marine seismic sensors to the seafloor. The apparatus is deployable and retrievable with conventional cable handling equipment and does not require special tools or equipment. Housing 16 can be formed in detachable segments fastened with clamps, bolts, bands, or other conventional binders.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for anchoring a motion sensor and cable to the seafloor in marine seismic operations, comprising:
    a housing attachable to the cable so that the cable pass through said housing, wherein said housing defines an interior space for containing the sensor, and wherein said housing has an exterior surface; and
    a plurality of discontinuous cleats extending outwardly from said housing exterior surface for releasably gripping the seafloor and for resisting involvement of said housing in at least two directions relative to the seafloor.

2. An apparatus as recited in claim 1, wherein said cleats are detachable from said housing.

3. An apparatus as recited in claim 1, wherein the sensor comprises a single component sensor.

4. An apparatus as recited in claim 1, wherein the sensor comprises a multi-component sensor.

5. An apparatus as recited in claim 1, wherein said cleats are positioned substantially around the entire exterior surface of said housing.

6. An apparatus as recited in claim 1, wherein said cleats are positioned on said using exterior surface at a selected minimum distance from adjacent cleats.

7. An apparatus as recited in claim 1, wherein the density of said housing is electable to accommodate the seafloor.

8. An apparatus as recited in claim 1, wherein said cleats extend outwardly from said housing exterior surface at varying lengths.

9. An apparatus as recited in claim 1, wherein said cleats extend outwardly from said housing exterior surface at a distance sufficient to contact consolidated soil within the seafloor.

10. An apparatus as recited in claim 1, wherein said housing exterior surface is formed with at least two flat surfaces parallel to the long dimension of the cable.

11. An apparatus as recited in claim 10, wherein a portion of said housing exterior surface has a cross section shaped as a hexagon.

12. An apparatus for deploying geophone sensors to the seafloor in marine seismic operations, comprising:
    a bottom cable deployable into the water;
    a housing attached to the cable so that the cable passes through said housing, wherein said housing defines an interior space for containing the sensor, and wherein said housing has an exterior surface;
    a plurality of discontinuous cleats extending outwardly from said housing exterior surface for releasably gripping the seafloor and for resisting movement of said housing in at least two directions relative to the seafloor.

13. An apparatus as recited in claim 12, wherein said cleats are integrated within said housing.

14. An apparatus as recited in claim 12, wherein said cleats are detachable from said housing.

15. An apparatus as recited in claim 12, wherein said housing exterior surface has a substantially flat surface for contacting the seafloor, and wherein said cleats extend outwardly from said flat surface.

16. A method for anchoring a geophone sensor and cable to the seafloor in marine seismic operations, comprising the steps of:
    deploying a vessel in water, wherein said vessel transports bottom cable and a plurality of sensor containing cleated housings attached to said cable so that the cable passes through said housings;
    paying out said bottom cable and attached housings into the water;
    positioning said bottom cable and attached housings at selected positions on the seafloor so that said housing cleats penetrate the seafloor and anchor said housings to the seafloor to resist movement of each of said housings in at least two directions relative to the seafloor;
    operating the sensors to detect geophysical data; and
    retrieving said housings from the seafloor.

17. A method as recited in claim 16, further comprising the step of replacing cleats on said housing with cleats of a different length.

18. A method as recited in claim 16, further comprising the step of attaching said housings to the cable.

19. A method as recited in claim 16, further comprising the step of moving said housings to another position on the seafloor before the housings and cable are retrieved to the vessel.

* * * * *